No. 673,999. Patented May 14, 1901.
E. CLIFF.
SIDE BEARING FOR RAILWAY CARS.
(Application filed Jan. 4, 1901.)
(No Model.)

WITNESSES:
Gustave Dieterich
John Kehlenbeck

INVENTOR
Edward Cliff
BY Chas. C. Gill
ATTORNEY

UNITED STATES PATENT OFFICE.

EDWARD CLIFF, OF NEWARK, NEW JERSEY.

SIDE BEARING FOR RAILWAY-CARS.

SPECIFICATION forming part of Letters Patent No. 673,999, dated May 14, 1901.

Application filed January 4, 1901. Serial No. 42,035. (No model.)

*To all whom it may concern:*

Be it known that I, EDWARD CLIFF, a citizen of the United States, and a resident of Newark, in the county of Essex and State of New Jersey, have invented certain new and useful Improvements in Side Bearings for Railway-Cars, of which the following is a specification.

The invention relates to improvements in side bearings for railway-cars; and it consists in the novel features, arrangement, and combinations of parts hereinafter described, and particularly pointed out in the claims.

The object of the invention is to produce a thoroughly efficient side bearing and one especially capable of obviating the known difficulties incident to hauling the cars around curves, especially short and tangent curves, and permitting the ready straightening out of the cars into alinement with the trucks after the cars have passed around such curves.

The side bearings made the subject hereof are particularly applicable to swiveling car-trucks and are applied in the usual location, intermediate the outer ends of the truck-bolster and body-bolster.

The invention will be fully understood from the detailed description hereinafter presented, reference being had to the accompanying drawings, in which—

Figure 1:
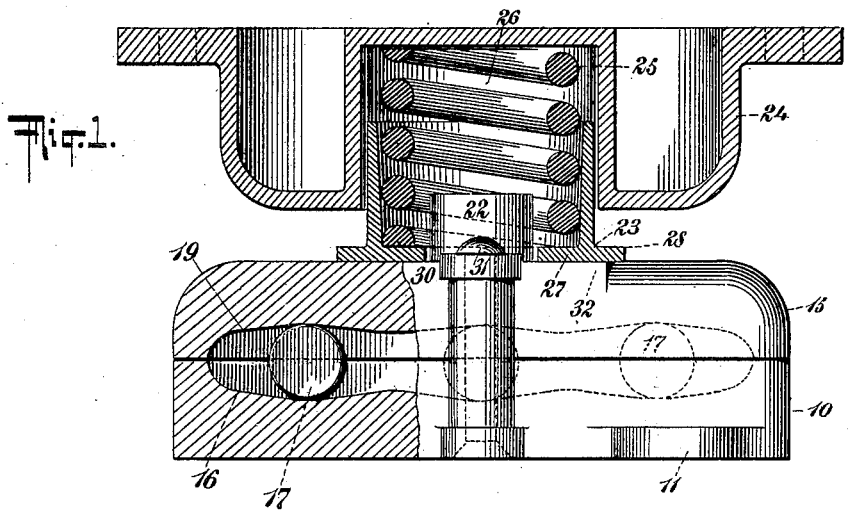
Figure 2:
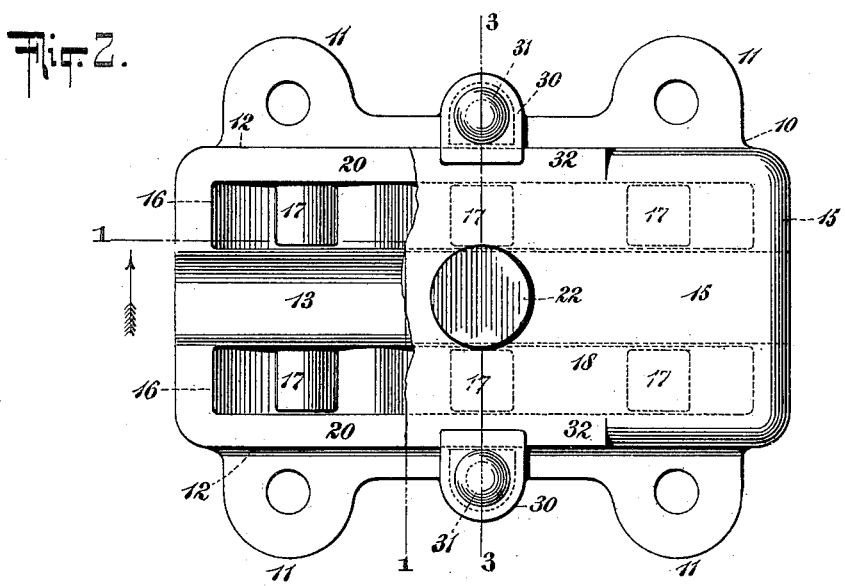
Figure 3:
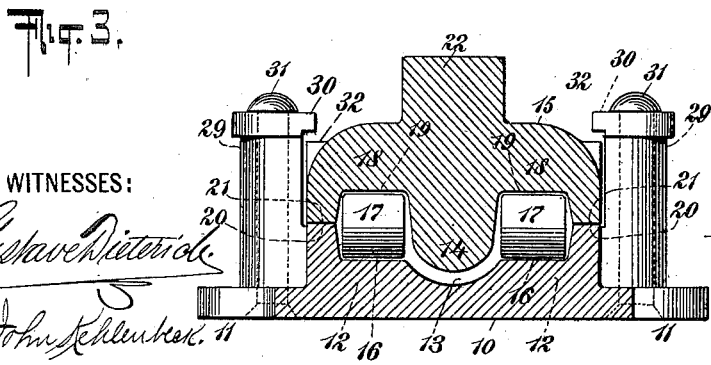

Figure 1 is a side elevation, partly in section, of a side bearing constructed in accordance with and embodying the invention, one end portion of the bearing for the truck-bolster being in section on the dotted line 1 1 of Fig. 2 and that part of the bearing for the body-bolster being in central longitudinal vertical section. Fig. 2 is a top view, partly broken away, of that portion of the side bearing intended for the truck-bolster; and Fig. 3 is a central vertical transverse section of same on the dotted line 3 3 of Fig. 2.

In the drawings, 10 designates the base or lower section of the side bearing for the truck-bolster, said base or lower section being formed with suitable ears 11 to receive the bolts by which the side bearing may be secured upon the end of the truck-bolster (not shown) in a well-known manner. The base or lower section 10 is in one integral casting and is formed with the vertical sides 12 12, between which the longitudinal groove or runway 13 is formed for the reception of the depending longitudinal central portion or rib 14 of the upper section 15 of the side bearing. The runway 13 is open at its ends, so as to permit the upper section 15 to have an endwise or longitudinal motion upon the base or lower section 10. In the upper surfaces of the sides 12 of the base 10 are formed the grooves 16 to receive and form runways for the rotary bearings 17, which in the present instance are in the form of short rollers and receive the upper section 15, said rollers 17 being independent of one another and each confined within a separate portion or chamber of the grooves 16. There is one groove at each side of the base or lower section 10, as shown in Fig. 2, and in the present instance each groove 16 has contracted parts, as shown in Fig. 1, whereby the groove 16 is subdivided into three chambers substantially independent of one another and each adapted to receive and permit of the traveling motion of a rotary bearing or roller 17. The number of subdivisions in the groove 16 and the number of rollers 17 in said groove will depend somewhat upon the size of structure and their conditions; but I recommend that each groove 16 be subdivided into three parts or chambers and that three of the rollers 17 be employed at each side of the base 10, as indicated in the drawings.

The upper section or part 15 of the side bearing has its central longitudinal portion 14 disposed within the runway 13 of the base 10 and its side portions 18 18 disposed directly over the sides 12 12 of the base or lower section 10, and in the lower faces of the said side portions 18 are formed the grooves 19, corresponding with the grooves 16 in the base 10 and adapted when said section 15 is in position to match said grooves 16 and therewith form a series of substantially independent chambers at each side of the bearing to inclose the rollers 17. The walls of the groove 19 are, like the walls of the groove 16, contracted at points, Fig. 1, and thus the grooves 16 and 19 when together form substantially three independent chambers, each containing its own roller 17. The three inner chambers formed by the matched grooves 16 19 have concave upper and lower central surfaces from which the upper and lower surfaces of said chambers pass on converging lines toward the end of the chambers, whereby the central portion of the chambers becomes of greater depth than the ends of the chambers, and in this central enlarged portion of the said chambers the rollers 17 are normally located, and said chambers become enabled to assure the centering of the rollers 17 during the employment of the side bearing. The grooves 16 19 are substantially rectangular in cross-section to correspond with the form of the rollers 17 in section, as illustrated; but in order to insure proper freedom of movement and the creation of the minimum amount of friction the inner side walls of the groove 19 are inclined inwardly from the inner facing ends of the rollers 17, as shown in Fig. 3, so that the ends of said rollers 17 may not rub their flat faces against said sides, and the outer side walls of the grooves 16 19 incline outwardly, as shown in Fig. 3, so that the flat faces of the outer ends of the rollers 17 may not rub against said walls.

At the opposite sides of the bearing the base 10 is formed at the extreme top of the sides 12 with a horizontal shoulder 20, and at the said opposite sides of the bearing the upper section 15 thereof is formed at the lower edges of its sides 18 with the shoulder 21, said shoulders 20 21 substantially matching one another, but only contacting with one another, if at all, when the rollers 17 are in their normal position centrally within their respective chambers formed by the grooves 16 and 19. It has been explained above that the upper and lower surfaces of the several chambers formed by the grooves 16 and 19 are concaved and that said surfaces extend on converging lines toward the ends of the said chambers, and this special form is imparted to said chambers so that while an endwise or longitudinal motion is imparted to the upper section 15 the rollers 17 will ride against the inclined surfaces of their respective chambers and avoid the rubbing of the shoulders 20 21 against each other and also in order that upon the return of the upper section 15 directly over the base or lower section 10 the rollers 17 may be returned to their normal central position within the said chambers.

The facing sides of the grooves 16 in the base 10 open into the runway 13 of said base, and likewise the facing sides of the grooves 19 open into the said runway 13, thereby permitting the escape from said grooves of any dust that may enter or gather in the same, said dust passing into the runway 13 and leaving the latter at its open ends.

The upper surfaces of the upper section 15 constitute the bearing-surfaces for the rub-iron on the body-bolster, and the said surfaces of the upper section 15 will be left perfectly plain when the side bearing is employed in connection with the plain rub-iron; but in accordance with my invention I contemplate the employment of a special construction of rub-iron for the body-bolster, as will be hereinafter explained, and when such special construction is made use of I shall prefer to cast upon the upper central portion or face of the upper section 15 a vertical stud 22, the form of which is clearly illustrated in the drawings and which in use will freely enter an aperture in the lower face of the cap 23, as shown in Fig. 1.

The structure disposed above the upper section 15 of the side bearing proper in Fig. 1 may be considered as a rub-iron for the body-bolster or as a part of the side bearing, one portion of which is to be secured to the truck-bolster and the other portion of which (located above the upper section 15) is to be secured to the body-bolster, since both of said parts coact with one another as an efficient side bearing, although that portion of the side bearing below the upper horizontal plane of the upper section 15 may be used by itself as a side bearing, as will be apparent.

The structure shown in Fig. 1 for coaction with the side bearing proper comprises the shell 24 to be secured to the end of the body-bolster, the cap 23, above mentioned, and the coiled spring 25, the latter being confined within the sides of the cap 23 and chamber 26, said chamber 26 being formed in the central part of the shell or casing 24 and receiving said spring and sides of the cap 23, said cap being in the form of a receptacle having its lower end 27 closed except at the central aperture therein, which passes upon the aforesaid stud 22. The lower end of the cap 23 is surrounded by an extension or flange 28, which extends laterally beyond the joint between the vertical walls of the chamber 26 and outer vertical sides of the cap 23, whereby said flange 28 is enabled to afford greater bearing-surfaces for the lower end of the cap 23 and also prevent the contact of the lower edges of the walls of the chamber 26 with the upper surfaces of the upper section 15. The lower end of the cap 23 bears centrally upon the upper surfaces of the upper section 15 and is yieldingly held against the upper surfaces of the section 15 by reason of the presence of the spring 25. The spring 25 is, however, yielding, and thus under the variations of the pressure the cap 23 is adapted to have a vertical yielding motion within the chamber 26. The lower end of the cap 23 affords a yielding bearing-surface to engage the upper surface of the upper section 15 of the side bearing, and the said cap 23 may or may not, as desired, be employed in connection with the stud 22, the purpose of the latter merely being, by its engagement with the cap 23, to afford a means apart from friction to compel the travel of the upper section 15 on the base 10 during the curving of the cars. In the absence of the stud 22 from the upper section 15 of the side bearing the said section 15 would depend for its endwise motion upon the force exerted through the frictional contact of the lower end of the cap 23 with the upper surface of said section 15; but when the lug 22 is made use of its engagement with the cap 23 will certainly aid in compelling the traveling motion of the upper section 15 when the cars are curving.

I regard the employment of the spring bearing-surfaces furnished by the cap 23, constituting a part of the "rub-iron," if such it may be called, as of importance in that thereby said surfaces are yielding and while in contact with the upper section 15 of the side bearing prevent in large measure the pounding of the latter and the flattening of the rotary bearings 17.

In order that the upper section 15 of the side bearing may not under any circumstances be thrown upward from the base 10, I provide on said base the vertical tubular ears 29 29 to receive upon their upper edges the clips 30 and in their interior the bolts 31, said bolts passing downward through said tubular ears 29 and holding the clips 30 upon the upper ends of said ears. The clips 30 project over the opposite side edges of the section 15, but do not contact with said edges under normal conditions, and the opposite side edges of the section 15 are formed with the horizontal shoulders 32, over which the clips 30 pass and which are of such length that they will remain below the clips 30 during the travel in either direction of the section 15 upon the rollers 17. The clips 30 perform no office except to prevent under unusual circumstances the section 15 from losing its place upon the base or lower section 10.

I illustrate the side bearing as being straight or elongated, this being one customary form for side bearings. It is obvious, however, that the side bearing may be made curved on the arc of a circle instead of straight, since both forms of side bearings are well known in this art. When the side bearing is made on a curved line, the grooves 16 and 19 will be correspondingly curved. I illustrate the rotary bearings intermediate the upper and lower sections of the side bearing as being in the form of rollers 17; but I do not limit my invention in every respect to the employment of rollers 17 of the form shown, since in this art rollers and balls have come to be well known, and hence my invention comprises the employment of either rollers 17 or round balls in lieu of the rollers. When balls are employed instead of rollers 17, the grooves 16 19 should be circular in cross-section instead of rectangular in cross-section. In the employment of either the rollers or balls the said devices constitute rotary traveling bearings for the upper section 15, and in respect of my present invention they are to be regarded as equivalents for one another.

In the employment of the invention the lower or base section 10 of the side bearing will be securely fastened upon the end of the truck-bolster, and the upper section 15 will be applied upon the said section or base 10 in the manner shown in Figs. 1 and 3, and the casing 24 will be secured to the end of the body-bolster in a well-known manner, and the spring-cap 23 will be allowed to pass downward upon the upper section 15 and over the lug 22, and thereupon the entire side bearing will be in condition for use. The lower end of the spring-cap 23 will bear on the upper surfaces of the upper section 15, and during the curving and straightening out of the cars the said cap will compel an endwise or traveling motion in said upper section 15, the latter traveling on and with the rotary bearings 17. During the endwise motion of the upper section 15 the said section will not bear against the lower section 10, since the movement of the rollers 17 on the inclined portions of the chambers formed in the grooves 16 19 will effect a slight elevation of said upper section 15 sufficient to free the latter from direct contact with the base-section 10. The form of the chambers created for the rollers 17 in the grooves 16 19 will also insure the return of the said rollers to their central normal position in the middle of said chambers when the section 15 is returned to its normal position over the base-section 10.

I desire it to be distinctly understood that I do not limit the invention to the employment of the casing 24, cap 23, spring 25, and lug 22, since that portion of the device comprising the upper section 15 and the parts below the same constitute an important part of the invention, which may be utilized in connection with the ordinary rub-irons used on the body-bolsters of railway-cars. I do regard it of importance, however, to make use of the casing 24, spring 25, and cap 23, as constituting a novel rub-iron or a novel part of the side-bearing structure, and hence I recommend the use of the said casing, spring, and cap, since when said devices are used the car becomes more evenly balanced, and there is less wear and tear on the side bearings and rails.

There is one important feature of the side bearing proper, hereinbefore described, and it is that when the upper section 15 is directly over the base-section 15, as shown in Fig. 1, the rotary bearings 17 are in the central portion of their respective chambers or grooves and that said rotary bearings are of such diameter that when in that position they allow the upper section 15 along its shoulders 21 to contact with the lower or base section 10 along its shoulders 20, whereby any hammering or pounding which may take place upon the upper section 15 during the travel of the cars on straight track will not flatten the rotary bearings 17, the latter being at such time protected by the contact of the upper section 15 with the lower or base section 10. When, however, the cars start to curve and the upper section 15 to move endwise, the rollers 17, riding on the inclined portions of the groove 16, will effect a slight elevation of the section 15, as hereinbefore described, and at such time the said section 15 will move upon the rotary bearings 17 without rubbing against the lower or base section 10.

What I claim as my invention, and desire to secure by Letters Patent, is—

1. The side bearing comprising the base-section containing the series of chambers, and the rotary bearings confined in said chambers, combined with the upper section mounted on said base and containing the series of chambers adapted to match the chambers in the base-section and therewith form inclosures to receive said rotary bearings, said inclosures being concaved at their central portions and thence extending on converging lines toward their end portions, and said inclosures being of such depth at their middle portions that the said upper section, may, when in its normal at-rest position, contact with said base-section and prevent the pounding of said rotary bearings, and said inclosures also being of such depth at each side of their central portions that, upon the movement of said upper section in an endwise direction on said rotary bearings, it will be elevated from said lower section so as to travel on said rotary bearings without rubbing against said lower section; substantially as set forth.

2. The side bearing comprising the base-section containing longitudinal grooves, and the rotary bearings therein, combined with the upper section mounted on said base and containing the longitudinal grooves adapted to match the grooves in the base-section and therewith form independent chambers to receive said rotary bearings, said chambers at their central portion being slightly greater in depth than the diameter of the said bearings and at their end portions being less in depth than the diameter of said bearings, whereby when the upper section is in its normal at-rest position it will bear upon the lower section, and when in the act of traveling endwise, it will ride on said rotary bearings free of said lower section; substantially as set forth.

3. In a side bearing, the base-section 10 having the runway 13 and sides 12, the latter containing the series of grooves 16, and the rotary bearings within said grooves, combined with the upper section 15 having the projecting portion 14 to move in said runway 13 and provided in its sides 18 with the series of grooves 19, the latter matching the grooves 16 in the base-section and therewith forming chambers for said rotary bearings, said chambers at their central portions being slightly greater in depth than said rotary bearings and at each side of the said central portions being less in depth than said rotary bearings, whereby said upper section 15 may contact with the base-section when said rotary bearings are centrally within said chambers and is elevated from said base-section while traveling endwise on said rotary bearings; substantially as set forth.

4. In a side bearing, the base-section having the sides 12 furnishing the shoulders 20 and series of grooves 16, and the rotary bearings 17 within said grooves, combined with the upper section 15 provided with sides 18 having the shoulders 21 and grooves 19, the shoulders 21 matching the shoulders 20 of the base-section, and the grooves 19 matching the grooves 16 in the base-section and therewith forming the chambers for said rotary bearings 17, said chambers being at their central portion of greater depth than the rotary bearings 17 and at their end portions being less in depth than said rotary bearings, whereby when said section 15 is directly over the base-section it will rest upon said base-section and when traveling endwise will be caused by said rotary bearings to leave said base-section and travel on said bearings; substantially as set forth.

5. In a side bearing, the base-section 10 having the runway 13 open at both ends and provided with the sides 12 containing the grooves 16, and the rotary bearings 17 within said grooves, combined with the upper section 15 having the grooves 19 adapted to match said grooves 16 and therewith form chambers for said rotary bearings 17, said chambers opening into said runway, whereby dust may escape therefrom into said runway, and said chambers at their central portions being of greater depth than said rotary bearings and at the opposite sides of their center being less in depth than said rotary bearings, whereby when said section 15 is directly over said base-section, said section 15 will rest upon said base-section, and when said section 15 is caused to move endwise it will ride on said rotary bearings free of said base-section; substantially as set forth.

6. In a side bearing, the base-section, the upper section adapted thereto, and rotary bearings intermediate said sections and upon which said upper section is adapted to have an endwise or traveling movement, combined with a yielding member above said upper section to receive the initial force of the body-bolster; substantially as set forth.

7. In a side bearing, the base-section, the upper section adapted thereto, and the series of rotary bearings confined between said sections and free to rotate and travel longitudinally of the side bearing, said upper section being adapted to have an endwise motion on said rotary bearings, combined with a rub-iron, and means connecting said rub-iron and said upper section so as to compel the movement of said upper section with the body-bolster; substantially as set forth.

8. In a side bearing, the base-section, the upper section adapted thereto, and rotary bearings intermediate said sections and upon which said upper section is adapted to have an endwise or traveling movement, combined with a yielding rub-iron to be suspended from the body-bolster and to engage said upper section; substantially as set forth.

9. In a side bearing, the base-section, the upper section adapted thereto, and rotary bearings intermediate said sections and upon which said upper section is adapted to have an endwise or traveling movement, combined with the rub-iron casing 24 containing an interior chamber, a spring in said chamber, and a cap engaged by said spring and having its end surfaces in contact with said upper section so as to form a yielding contact with said upper section; substantially as set forth.

10. In a side bearing, the base-section, the upper section adapted thereto, and the series of rotary bearings confined between said sections and free to rotate and travel longitudinally of the side bearing, said upper section being adapted to have an endwise motion on said rotary bearings, combined with a rub-iron having a yielding surface for contact with said upper section, and means connecting said yielding surface with said upper section so as to compel the traveling motion of said upper section with the body-bolster; substantially as set forth.

11. In a side bearing, the base-section, the upper section adapted thereto, and rotary bearings intermediate said sections and upon which said upper section is adapted to have an endwise or traveling movement, combined with a rub-iron having a yielding surface for contact with said upper section, and means detachably connecting said yielding surface with said upper section; substantially as set forth.

12. In a side bearing, the base-section, the upper section adapted thereto, and rotary bearings intermediate said sections and upon which said upper section is adapted to have an endwise or traveling movement, combined with the rub-iron casing 24 having the interior chamber, the spring within said chamber, the cap 23 adapted to said chamber and engaged by said spring, and the stud connecting said cap with said upper section, said cap affording a yielding bearing-surface to engage said upper section, and said stud detachably connecting said cap and upper section and compelling the movement of said upper section with the body-bolster; substantially as set forth.

13. In a side bearing, the base-section, an upper section adapted thereto, and rotary bearings intermediate said sections and upon which said upper section is adapted to have an endwise or traveling movement, combined with the casing for the body-bolster, and a spring confined between said casing and the body of said upper section and adapted to receive the initial force of the body-bolster; substantially as set forth.

Signed at New York, in the county of New York and State of New York, this 3d day of January, A. D. 1901.

EDWARD CLIFF.

Witnesses:
CHAS. C. GILL,
GUNDER GUNDERSON.